March 2, 1937.  W. GOODMAN  2,072,166

AIR CONDITIONING SYSTEM

Original Filed July 11, 1932  2 Sheets—Sheet 1

INVENTOR
William Goodman
BY
ATTORNEY

March 2, 1937.   W. GOODMAN   2,072,166
AIR CONDITIONING SYSTEM
Original Filed July 11, 1932   2 Sheets-Sheet 2

INVENTOR
William Goodman
BY Wm. O. Bell
ATTORNEY

Patented Mar. 2, 1937

2,072,166

UNITED STATES PATENT OFFICE 2,072,166

AIR CONDITIONING SYSTEM

William Goodman, Chicago, Ill., assignor to General Motors Corporation, Dayton, Ohio, a corporation of Delaware Application July 11, 1932, Serial No. 621,944
Renewed August 10, 1935

35 Claims. (Cl. 257—9)

This invention relates to air conditioning systems and more particularly to a system especially adapted for conditioning the air in different parts of a building as, for example, different floors or rooms in accordance with the requirements in different parts of the building.

One of the objects of my invention is to provide an air conditioning system embodying a source of supply of conditioned air and to maintain dry bulb temperatures and relative humidities in different parts of a building pursuant to the respective requirements or conditions and notwithstanding varying sensible heat and moisture gains or losses in the different parts of the building.

If no sensible heat is added to saturated air leaving a conditioner, its dry bulb and dew point temperatures are the same. As conditioned air enters a room, it is heated by the sensible heat liberated in the room and the air also absorbs moisture liberated in the room. Under extreme conditions, if the volume of low temperature saturated air supplied to a room to absorb all of the moisture being liberated is so great that the sensible heat liberated in the room is insufficient in quantity to heat the air supply to the desired dry bulb temperature, I have found that this dry bulb temperature gradually falls below that desired to be maintained. Under such conditions sensible heat must be added to the air supply in an amount sufficient to reduce the sensible heat absorbing capacity of the air so that the sensible heat liberated in the room merely heats the air to the desired temperature and this in no way impairs the moisture absorbing capacity of the air supply. Hence, another object of my invention is to provide an air conditioning system wherein sensible heat may be added to the air and to add this sensible heat without the necessity of increasing the capacity of the refrigerating device of the system over that which would be required if no sensible heat were added.

A further object is to provide a common source of conditioned air for different independent parts of a building and to provide individual controls to regulate the air condition in these different parts pursuant to the requirements by using conditioned air from the common source and varying the characteristics of this air prior to passage thereof into said different parts of the building.

A still further object is to extract heat from air entering the air conditioner and to add this extracted heat to air discharged from the air conditioner as required.

Selected embodiments of the invention are illustrated in the accompanying drawings wherein Fig. 1 is a partly diagrammatic view illustrating a common source of conditioned air and a system of supplying this conditioned air to different rooms in a building;

Figures 1, 1A:
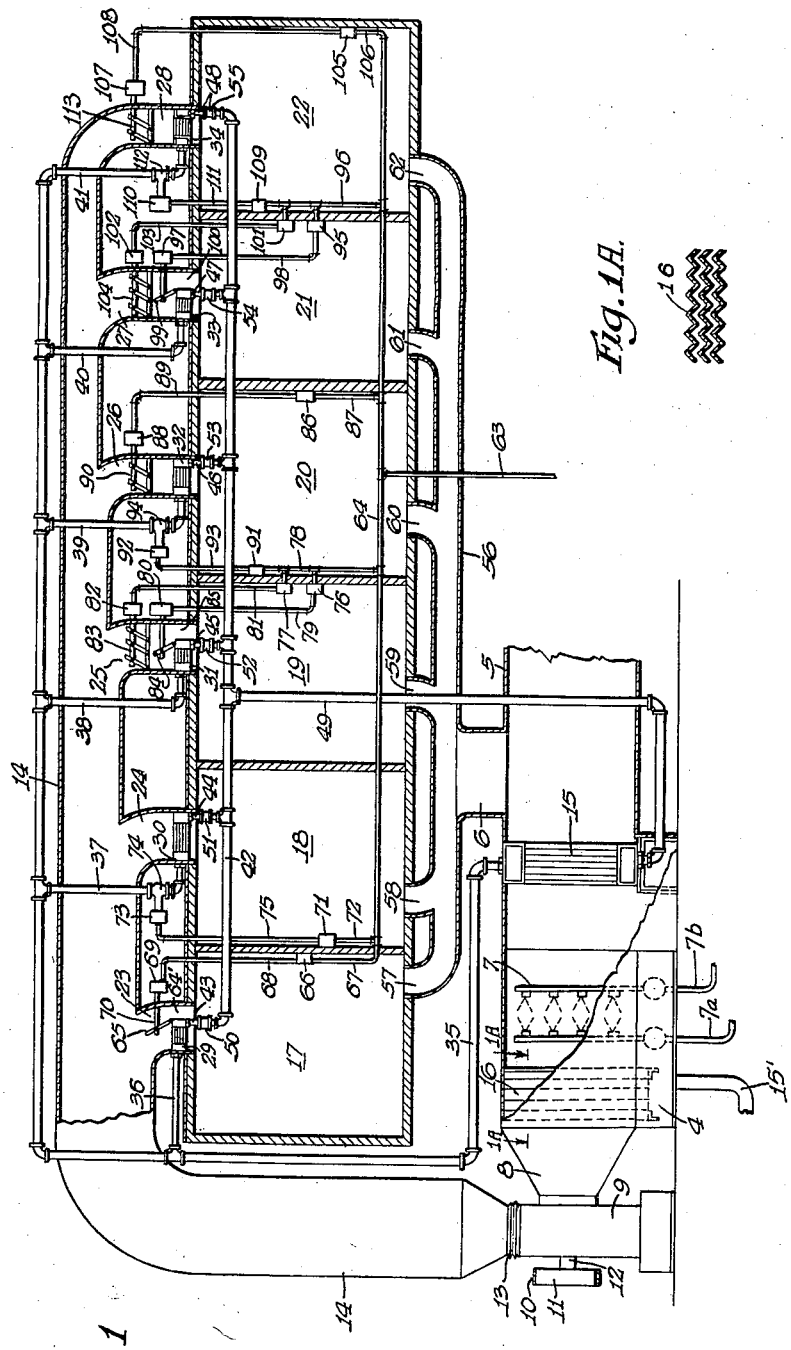
Fig. 1A is a fragmentary sectional view of the eliminator and taken substantially on the line 1A—1A of Fig. 1.

Referring to the accompanying drawings, and more particularly to Fig. 1, 4 indicates generally an air conditioner. An air inlet conduit 5 communicating with a source of fresh air leads to the conditioner and this conduit includes an inlet 6 to be described more fully hereinafter. A water spray 7 is provided in the conditioner 4 and is connected to a source of cold water by pipes 7a and 7b. Air passing into the conditioner flows in thermal contact with a primary refrigerant, such as through the spray 7. At the end of the conditioner opposite the conduit 5 is a discharge conduit 8 leading to a fan housing 9 having a fan therein driven in a suitable manner as by a belt 10 directed about the pulley 11 fast on the fan shaft 12. A flexible connection 13 connects the discharge of the fan housing with a supply duct 14. In the conduit 5 adjacent the air conditioner 4 is an evaporator or calefactory member 15. An eliminator 16 is located in the conditioner 4 intermediate the spray 7 and the outlet conduit 8. This eliminator, in illustrated embodiment, includes a plurality of tortuous passages through which the water laden air so travels that it impinges on the walls of the passages to be mechanically freed of entrained water. The eliminated water and the water flowing from the spray pass off through the drain 15'. The conditioned air passes through the supply duct 14 and to the rooms 17, 18, 19, 20, 21, and 22 through inlets 23 to 27, inclusive, which inlets respectively lead to the rooms 17 to 21, inclusive. The duct 14 terminates in an inlet 28 leading to the room 22. At each of the inlets the size of the duct 14 is successively reduced for the purpose well understood in the art. In the inlets 23 to 28, inclusive and respectively, are condensers or calefactory members 29 to 34, inclusive. A pipe 35 leads from the upper end of the evaporator 15 and pipes 36 to 41, inclusive and respectively, interconnect condensers 29 to 34, inclusive, with the pipe 35. A pipe 42 is connected to the condensers 29 to 34, inclusive and respectively, through the pipes 43 to 48, inclusive, and a pipe 49 leads from the pipe 42 to the lower part of the evaporator 15. Check valves 50 to 55, inclusive, or other suitable liquid trapping devices, are respectively positioned in the pipes 43 to 48, inclusive. A suitable fluid, such as water or secondary volatile refrigerant, dichlorodifluoromethane, sulphur dioxide, or the like, is introduced into the closed system including the secondary refrigerant evaporator 15, the secondary refrigerant condensers 29 to 34, inclusive, and the pipes interconnecting the evaporator 15 and condensers forming a secondary volatile refrigerant closed circuit separate from the primary refrigerant at 7. Preferably the fluid in the evaporator 15 is in a liquid state and as the warm air passing from the conduit 5 flows through the evaporator 15 heat is extracted from the air and is taken up by the liquid in the evaporator which converts the liquid into a vapor state and the vapor passes through the pipe 35 and pipes 36 to 41, inclusive, to the respective condensers 29 to 34, inclusive. Conditioned air flowing through the inlets 23 to 28, inclusive, may be caused to flow through the condensers 29 to 34, inclusive, as will be explained, and this conditioned air condenses the vapor in the condensers. The condensed vapor flows through the pipes 43 to 48, inclusive, into the pipe 42, into pipe 49, back to the evaporator 15. It will therefore be seen that heat is extracted from air flowing to the air conditioner and the air after having been conditioned may be caused to take up this extracted heat to add sensible heat to the conditioned air. Leading from each of the rooms to an air return duct 56 are outlets 57 to 62, inclusive. Air is withdrawn from the rooms through the outlets and flows through duct 56 and inlet 6, which communicates with duct 56, to be intermingled with air flowing through conduit 5.

It has been stated that an object of this invention is to provide individual controls to regulate the air condition in different parts of a building pursuant to the requirements of the various parts by using conditioned air from the common source and varying the characteristics of this air prior to the passage thereof into said different parts of the building. As an illustrative example of different parts of a building I have diagrammatically depicted in the accompanying drawings different rooms and will now describe different methods by which the air condition in these various rooms may be controlled pursuant to the requirements of each room. If a common source of conditioned air is employed, it is essential that the characteristics of the air supplied to different rooms be varied if air conditions in different rooms are to be maintained pursuant to the requirements of the respective rooms. An example of this is that if one room is located on the east side of a building and another room is located on the west side of a building it is apparent that during the morning hours the room on the east side of the building will be subjected to sun heat whereas the room on the west side of the building will be subjected to sun heat during the afternoon hours. Hence during the course of the day it is clear that the air conditions in the two rooms will vary appreciably. To care for this condition, independent controls are provided in each of the rooms. In Fig. 1 I have illustrated a different kind of control in each of the various rooms shown but it is to be understood that this is merely for the purpose of illustrating different kinds of controls, for the same type of control will preferably be provided in the different rooms in the same building although it is to be understood that different kinds of controls might be used for different rooms if so desired.

The control of air conditions in the various rooms is brought about by providing either a thermostat, a humidostat or other humidity controlling device, or both of such devices at proper places in the room and are thus responsive to functions of the psychrometric porperty of air. As an illustrative embodiment of such devices, I have illustrated pneumatically operated devices and I show a pipe 63 which extends from a suitable source of air pressure and which is connected to a distributing pipe 64. However, it is to be understood that control devices of other types may be employed as, for example, electrical devices may be used in place of the pneumatically operated devices illustrated.

The condenser 29 in the inlet 23 is smaller than the inlet and in this way a passage 64' is provided so that air may flow through the inlet without flowing through the condenser 29. Flow of air from the duct 14 and through the condenser 29 and the passage 64' is regulated by a damper 65 controlled by a thermostat 66. Ordinarily, the conditioned air admitted into the room, whether or not sensible heat is added thereto, has a sufficiently low dew point temperature and is sufficient in quantity to absorb all of the moisture liberated in the room or at least to absorb that amount necessary to maintain a desired condition of relative humidity.

The dry bulb temperature and relative humidity in a room may be maintained by introducing conditioned air at a dew point temperature below the dew point temperature of the room and varying the dry bulb temperature of the air supply in accordance with the dry bulb temperature in the room. The dry bulb and dew point temperatures of saturated conditioned air are the same and sensible heat liberated in the room raises the temperature of the air whereupon moisture liberated in a room is absorbed by the air. However, extreme variation in air conditions in a room may require the admission of a large volume of conditioned air in order to absorb all of the moisture liberated and as the temperature of the admitted air is below room temperature the quantity of sensible heat liberated in the room may not be great enough to sufficiently raise the temperature of the admitted air to maintain the desired room dry bulb temperature. To prevent a dry bulb temperature drop in the room when a large volume of conditioned air is admitted, sensible heat is added to the air supply before admission. Sensible heat added to conditioned air prior to admission into a room raises the dry bulb temperature of the air without affecting its moisture absorbing capacity for the conditioned air prior to admission into the room has a given dew point and this is not affected by the addition of sensible heat, and this conditioned air in rising to the room dew point temperature can absorb no more nor no less moisture than it could before the sensible heat is added. Thus, the dry bulb temperature in a room may be utilized to maintain a desired temperature and at the same time to maintain a desired condition of relative humidity.

In room 17, in Fig. 1 of the accompanying drawings, I show a thermostat 66 which, as has been stated, is of the pneumatic type and a pipe line 67 extends from the distributing pipe 64 to the thermostat to provide an air supply therefor. The thermostat 66 is affected by the dry bulb temperature in the room and as the temperature rises or falls, the thermostat is actuated. The thermostat is connected to an operating device 69 through a pipe 68 and upon actuation of the thermostat the operating device moves the damper 65 to which it is connected by a link 70. The thermostat is set to maintain whatever dry bulb temperature is desired in the room. If the room temperature tends to rise above the setting of the thermostat, the thermostat operates to cause the damper 65 to move into a position to obstruct flow of air through the condenser and the air freely flows through the passage 64' and sensible heat is not added thereto prior to admission into the room. The cooled conditioned air admitted into the room takes up sensible heat therein and if the volume of the admitted air is so great that the liberated sensible heat in the room is insufficient to raise the temperature of the air to the desired temperature, the dry bulb temperature in the room falls and the thermostat acts so that the operating device moves the damper into a position to obstruct the flow of air through the passage 64' and the air is deflected so that it passes through the condenser 29. The air flowing through the condenser takes up sensible heat therein which raises the temperature of the air admitted into the room. When the dry bulb temperature rises above that to be maintained in the room, the thermostat is again actuated and causes the operating device to shift the damper so that flow to the condenser is obstructed and flow to the passage 64' is open. This operation resulting in shifting of the damper continues until a proper balance is established between the conditioned air admitted to the room and the air in the room or until there is a sudden change in the condition of the air in the room, that is to say, if the dry bulb temperature of the room suddenly rises due to the admission of heat from some extraneous source, the damper is shifted to admit a larger volume of cooled air whereas if the temperature falls abnormally, the quantity of cooled conditioned air being admitted is reduced and sensible heat is added to the conditioned air prior to admission thereof into the room.

In the room 18 I show a thermostat 71 connected to the distributing pipe 64 through a pipe 72 and also connected to an operating device 73 through a pipe 75. The operating device 73 regulates a valve 74 in the pipe 37. All air flowing through inlet 24 also flows through the condenser 30. The temperature in the room is maintained by adding sensible heat to the air flowing through the condenser 30 in the same manner as that in which sensible heat is added to air flowing through the condenser 29. However, in this instance when the dry bulb temperature rises and affects the thermostat 71, the operating device 73 is actuated to close the valve 74 and no vapor is supplied to the condenser 30. Consequently, air flows through the condenser without sensible heat being added thereto. But should the dry bulb temperature fall below that at which the thermostat 71 is set, then the operating device 73 is actuated to open the valve 74 whereupon vapor is admitted into the condenser 30 and air flowing through this condenser takes up heat from the vapor and in this way sensible heat is added to the conditioned air. This alternate opening and closing of valve 74 continues until equilibrium is established.

Air flowing through both the condensers 29 and 30 takes up heat from the vapor therein and the vapor reverts to a liquid state and flows past the check valves into the pipe 42 through pipe 49 to the evaporator 15 as described.

While the relative or the absolute humidity in a room may be maintained within a desired range by merely controlling the dry bulb temperature in the room, there are conditions under which accurate control of the relative humidity is desired and it may also be desired to accurately maintain a certain dry bulb temperature. Under such conditions both a thermostat and a humidostat or hygrostat, or other humidity controlling device, are provided in the room wherein the accurate control of the relative humidity and dry bulb temperature is desired. Such an arrangement is provided for the room 19 and therein a thermostat 76 and a humidostat 77 are provided. Both the humidostat and the thermostat are connected to a pipe 78 leading from the distributing pipe 64. The thermostat 76 is connected through a pipe 79 to a control device 80 while the humidostat 77 is connected through a pipe 81 to a control device 82. A damper 83 of suitable construction is arranged to control flow through the inlet 25 and inwardly of the damper 83 is a damper 84 which controls air flow through the condenser 31, said condenser not completely closing off the inlet 25 so that a passage 85 is provided. If the relative humidity in the room 19 starts to rise, the humidostat 77 is actuated whereupon the control device 82 is operated and the damper 83 is so arranged that the volume of air passing into the room is increased. If sufficient sensible heat is not liberated in the room 19 to raise the temperature of the admitted air to the dry bulb temperature to be maintained in the room, the room temperature falls and the thermostat 76 is affected whereupon the operating device 80 so moves the damper 84 that flow through the passage 85 is obstructed and the air is caused to flow through the condenser 31 wherein heat is taken up by the air from the vapor in the condenser in the same manner as that in which heat was taken up by the air flowing through the condensers 29 and 30. When, however, the dry bulb temperature is raised to that to be maintained by the thermostat 76, the operating device 80 is actuated to move the damper 84 into a position to obstruct flow through the condenser 31 and the air consequently flows through the passage 85. This arrangement is substantially similar to that provided for the room 17 but it is to be noted that an independent control is provided to regulate the volume of air admitted which determines the relative or the absolute humidity in the room 19, this control for the flow of air being the damper 83.

In the room 20, a humidostat or hygrostat 86 is provided which is connected to the distributing pipe 64 through a pipe 87 and it is also connected to the operating device 88 through a pipe 89. The operating device 88 regulates the damper 90 which controls the flow of air through the inlet 26. A thermostat 91 is provided in the room 20 and is connected to the distributing pipe 64 through the pipe 78 and it is also connected to a control device 92 through a pipe 93. When the relative humidity in the room 20 rises, the humidostat 86 acts to motivate the operating device 88 whereupon the damper 90 is moved to admit a greater amount of air through the inlet 26 than was previously flowing therethrough. The condenser 32 entirely fills the inlet 26 and consequently all air flowing through this inlet also flows through the condenser 32. If the dry bulb temperature in the room 20 falls, the thermostat 91 is actuated to motivate the operating device 92 which in turn opens the valve 94 to which it is connected and vapor is admitted into the condenser 32. Consequently, the air flowing through the condenser takes up heat from the vapor in the same manner as air flowing through the condenser 30. When the temperature in the room 20 rises above that to be maintained, the thermostat 91 actuates the operating device 92 and the valve 94 is closed and consequently no vapor is admitted to the condenser 32. It will therefore be seen that by the arrangement shown in connection with the room 20, the relative or the absolute humidity and dry bulb temperature may be accurately maintained within a desired range.

I have described how a humidostat or a hygrostat may be employed to regulate the volume of air admitted into a room and how a thermostat could be employed to control the addition of sensible heat to the air. I have, however, found that either a humidostat or hygrostat may be employed to regulate the quantity of sensible heat added to the air.

In the room 21 I show a hygrostat or humidostat or other humidity controlling device 95 connected to the distributing pipe 64 through a pipe 96 and it is also connected to an operating device 97 through a pipe 98. The operating device 97 controls a damper 99 arranged to regulate the flow of air through the condenser 33, which condenser does not entirely fill the inlet 27 so that a passage 100 is provided. A thermostat 101 is connected to the distributing pipe 64 through a pipe 96 and to an operating device 102 through a pipe 103. The operating device 102 regulates a damper 104 which controls the flow of air through the inlet 27.

In the room 22 I show a thermostat 105 connected to the distributing pipe 64 through a pipe 106 and to an operating device 107 through a pipe 108. A humidostat or hygrostat 109 is connected to the distributing pipe 64 through the pipe 96 and to an operating device 110 through a pipe 111. The operating device 110 controls a valve 112 which regulates the flow of air through a condenser 34 arranged entirely across the inlet 28 and flow through said inlet is controlled by a damper 113 regulated by the operating device 107.

To insure satisfactory operation the dew point temperature of the conditioned air must always be below the dew point temperature of the air in the room. When arrangements such as are shown in connection with the rooms 21 and 22 are utilized, the dew point temperature of the conditioned air supply is preferably maintained constant but satisfactory operation will result so long as it is maintained below the dew point temperature of the air in the rooms. Now if the dew point of the conditioned air drops, the relative humidity of the room air also drops and the humidostat acts to reduce the amount of sensible heat added to the air supply. In the room 21, this is accomplished by positioning the damper 99 to obstruct flow to the condenser 33 and in the room 22 this is accomplished by closing the valve 112. This increases the sensible heat absorbing capacity of the conditioned air and the dry bulb temperature in the room falls. When this occurs, the thermostats 101 and 105 actuate the operating devices 102 and 107 to so position the dampers 104 and 113 that the volume of air supplied to the rooms is decreased and this tends to raise the dry bulb temperature in the rooms. With a smaller volume of air admitted to the room, the relative humidity will rise back to the point set on the humidostat.

If the dry bulb temperature of the conditioned air starts to rise there will be a similar rise in the rooms and the thermostats act to increase the volume of conditioned air admitted into the rooms. This causes the relative humidity to drop and the humidostats act to reduce the sensible heat added to the air supply which increases the sensible heat absorbing capacity of the air supply and lowers the dry bulb temperature whereupon the thermostats act to reduce the volume of air supplied to the rooms and this continues until equilibrium is established.

It is to be understood that the condition in the rooms 21 and 22 is maintained independently, the description relative to these rooms having been combined to facilitate explanation for the devices associated with these rooms operate in the manner which has been previously described.

Thus, where a thermostat and humidostat are employed to maintain a desired condition of relative humidity and a desired dry bulb temperature, the humidostat may be used to control the quantity of sensible heat added to the air supply, for variations in the quantity of sensible heat added to the air supply affect the dry bulb temperature in the room, which in turn affects the thermostat. The thermostat then acts to vary the quantity of air supplied to the room. This variation in the air supply alters the moisture absorbing capacity of the air supply and consequently the relative humidity in the room may be accurately controlled. In other words, the humidostat, by varying the amount of sensible heat added to the air supply, continually forces the thermostat, in order to maintain a constant dry bulb temperature in the room, to vary the quantity of air supplied to the room.

Figure 2:
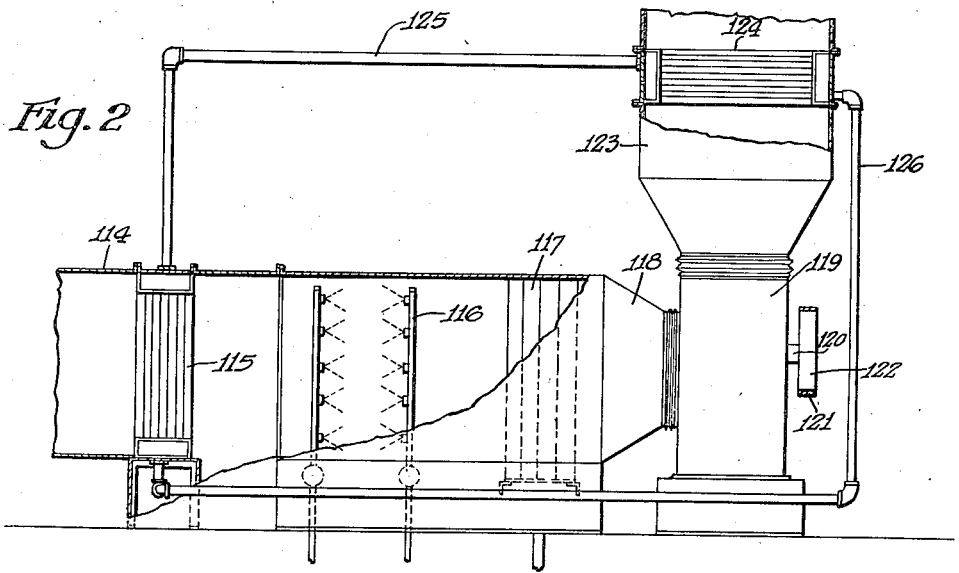
Fig. 2 is a partly diagrammatic view illustrating another form of air conditioner.

Heretofore I have described an air conditioner adapted to deliver air to which no sensible heat is added and sensible heat is added to the air in accordance with the conditions of each room to which the air is supplied. However, under certain conditions it may be desirable to add sensible heat to air passing into a duct, such as 14, when the temperature and relative humidity of air in independent rooms are to be controlled centrally or where the temperature and relative humidity of air in but a single room are to be controlled and to do this sensible heat may be added to the air as it flows from the fan housing. Such an arrangement is illustrated in Fig. 2 wherein an inlet conduit 114 is illustrated. This inlet conduit may lead from a source of fresh air or from a return air duct or it may lead from both a source of fresh air and a return air duct, as illustrated in Fig. 1. The air passing through the conduit 114 first flows over an evaporator or calefactory member 115, then past a spray 116 to an eliminator 117 and through an outlet conduit 118 into a fan housing 119 wherein a fan mounted on the shaft 120 forces the air to a delivery duct 123 wherein a condenser 124 is provided. The fan is operated by a belt 121 directed about the pulley 122 fast on the shaft 120. The upper part of the evaporator 115 is connected to the condenser 124 through a pipe 125 and a return pipe 126 leads to the bottom part of the evaporator 115. As air passes through the inlet conduit 114 and over the evaporator 115 heat is extracted therefrom in the evaporator wherein a suitable fluid such as water, sulphur dioxide, or the like is stored. The heat extracted from the air converts the fluid into a vapor state and it passes through the pipe 125 to a condenser or calefactory member 124. The cooled air passing through the duct 123 flows through the condenser 124 and sensible heat is added thereto, this heat being extracted from the vapor in the condenser and consequently the fluid reverts to a liquid state and flows through the pipe 126 back to the condenser 115.

Figure 3:
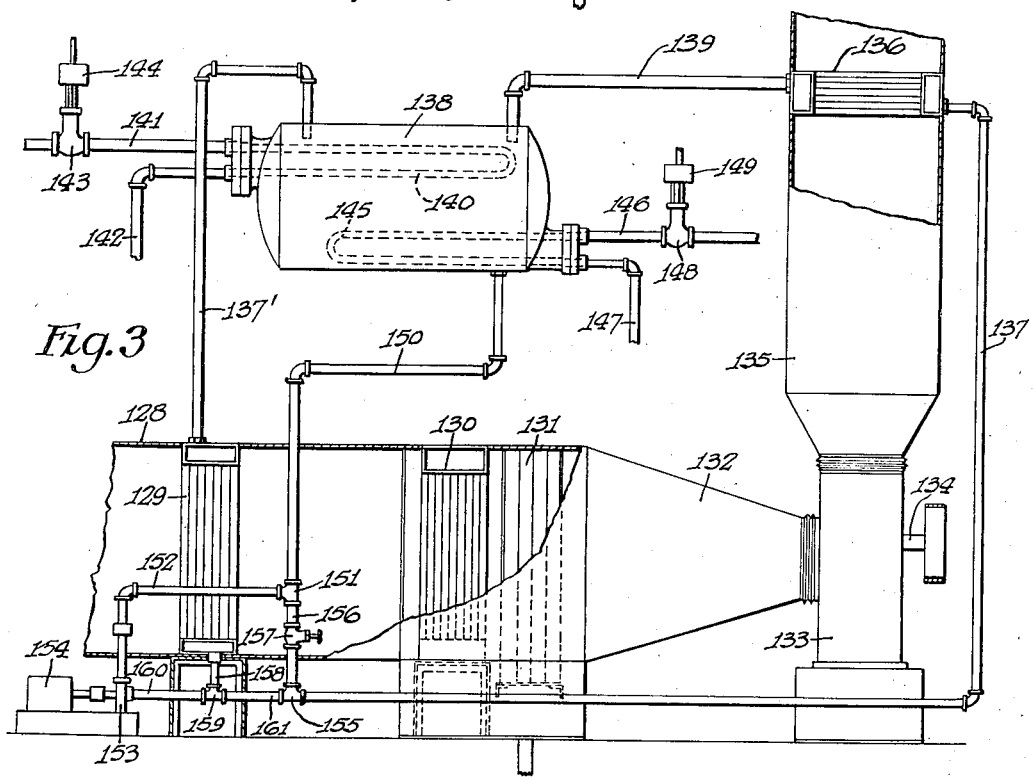
Fig. 3 is a partly diagrammatic view illustrating still another form of air conditioner.

A further modification of an air conditioning arrangement is illustrated in Fig. 3 and herein an inlet conduit 128 is provided which, like the conduits 5 and 114, may lead from a source of fresh air, a return air duct, or both. An evaporator or calefactory member 129 is provided and air flowing through the conduit 128 passes through this evaporator. A dehumidifier consisting of the refrigerating coil 130 for primary refrigerant separate from the secondary refrigerant and an eliminator 131 is arranged between the inlet conduit 128 and the outlet conduit 132 which leads to a fan housing 133 and a fan mounted on the shaft 134 draws air through the conduit 128 past the evaporator 129, refrigerating coil 130, and eliminator 131 and discharges the air into a distributing duct 135. In the distributing duct 135 is a condenser or calefactory member 136 having a return pipe 137 leading therefrom. Leading from the upper part of the evaporator 129 is a pipe 137' which leads into a tank 138. A pipe 139 leads from the tank to the condenser 136. In the tank 138 is a cold water coil 140 including an inlet pipe 141 and an outlet pipe 142. An automatic valve 143 is provided in the inlet pipe 141 and is actuated by an operating device 144 which may be controlled by a thermostat arranged in the room to which air is being supplied or in the supply duct or return air duct to be affected by the air temperature so that if the temperature of the air rises the valve 143 will open to permit water to flow through the coil 140 and when the temperature falls the valve 143 will tend to close. Also arranged in the tank 138 is a steam coil 145 including an inlet line 146 and an outlet line 147. A valve 148 is provided in the inlet line 146 and is actuated by an operating device 149 which in turn may be regulated in the same manner as the thermostatic device 144. A return pipe 150 leads from the tank 138 to a T-fitting 151. A pipe line 152 leads from the T-fitting 151 to a pump 153 operated by an electric motor 154 or the like. The return line 137 terminates in a T-fitting 155 and a pipe 156 extends between the T-fittings 151 and 155 and has a valve 157 therein. A pipe 158 leads from the bottom of the evaporator 149 to a T-fitting 159 and a pipe 160 extends between the pump 153 and the T-fitting 159. Another pipe 161 extends between the T-fittings 159 and 155.

The water coil 140 and the steam coil 145 are not used at the same time, the water coil being used during the summer when the heat flow is into the room or the like to which the conditioned air is supplied while the steam coil 145 is used during the winter when the heat flow is out of the room. When the water coil 140 is being used, the valve 157 is open and the pump 153 is not operated. The fluid or secondary refrigerant in liquid state substantially fills the evaporator 129 and seeks a corresponding level in the pipes 150 and 137'. As the warm air passes through the evaporator, the liquid is converted into a vapor state and passes into the pipe 137' and is discharged into the tank 138. From the tank 138 the vapor flows through the pipe 139 to the condenser 136 and the cooled air flowing through the duct 135 flows through the condenser 136 and takes up sensible heat and the vapor reverts to a liquid state and returns through the pipe 137. As the temperature rises, the control mechanism regulating the operating device 144 opens the valve 143 whereupon cold water flows through the coil 140. This cold water condenses vapor in the tank 138 which reverts to a liquid state and returns through pipe 150.

The amount of cold water flowing through the coil 140 determines the quantity of vapor passing to the condenser 136 and by alternate opening and closing of the valve 143, as brought about by the operating device 144, a state of equilibrium is reached and this is maintained until there is a variation in the temperature or humidity of the air passing through the duct 135 or in the room or rooms to which this air is supplied. Thus by controlling the flow of water through the coil 140, the amount of sensible heat added to the air flowing through the duct 135 may be accurately regulated.

When the steam coil 145 is to be employed, the valve 157 is closed and the pump 153 acts to withdraw liquid from the pipes 137, 161, 158, and 160, and forces the liquid through the pipe 152, T-fitting 151 and pipe 150 into the tank 138. This liquid is heated by the steam or other heating medium flowing through the coil 145 and is converted into a vapor state and it passes through the pipe 137' to the evaporator 129, which in this instance acts as a condenser, and through pipe 139 to the condenser 136. Air passing over the condenser 129 and condenser 136 takes up sensible heat and the vapor in these condensers reverts to a liquid state and is withdrawn by the pump 153 and forced back into the tank 138 to be reheated and vaporized. Hence it is apparent that the sensible heat may be added to the air to raise the temperature thereof so that the temperature in the room to which air is supplied by the duct 135 may be kept above atmospheric temperature.

It is to be understood that the air conditioners illustrated in Figs. 1, 2, and 3 may be used to supply air to the duct 14. And further, any one of the control arrangements shown in connection with the rooms 17 to 22, inclusive, may be used to control the air discharge from the duct 14. It is also to be understood that other analogous devices may be used to bring about the advantageous results accomplished by this invention.

Hence while I have illustrated and described selected embodiments of my invention, it is to be understood that these are capable of variation and modification and I therefore do not wish to be limited to the precise details set forth but desire to avail myself of such changes and modifications as fall within the purview of the following claims.

I claim:

1. In an apparatus of the class described, a closed system comprising spaced calefactory members and a vapor supply pipe leading from the first of said calefactory members to the second of said calefactory members and a liquid return pipe interconnecting said calefactory members, said system having a liquid in the return pipe and substantially filling the first of said calefactory members and with little or no liquid in the second of said calefactory members, a cooling means interposed between said calefactory members, and means for directing a fluid through said calefactory members and said cooling means whereby heat extracted from the fluid as it passes through the first of said calefactory members vaporizes the liquid therein and increases the pressure in said first calefactory member to induce flow of vapor to the second of said calefactory members, the fluid flowing from said cooling means to the second of said calefactory members condensing the vapor and reducing the pressure in the second of said calefactory members to further induce vapor flow thereto, vapor condensed in the second of said calefactory members being directed back to the first of said calefactory members through said liquid return pipe.

2. In an apparatus for conditioning air, a closed system comprising an evaporator and a condenser, a vapor supply pipe interconnecting said evaporator and condenser, a liquid return pipe interconnecting said evaporator and condenser, said closed system having a liquid therein in said return pipe and substantially filling said evaporator, said condenser being substantially free of liquid, a duct for directing air through said evaporator and to said condenser, air cooling means in said duct between said evaporator and said condenser, and means for inducing a flow of air through said duct whereby the air first flows through said evaporator to vaporize the liquid and increase the pressure therein to induce the vapor to flow to said condenser, air flowing from said cooling means and through said condenser condensing the vapor in said condenser and reducing the pressure therein to further induce flow of vapor from said evaporator to said condenser, vapor condensed in said condenser flowing through said liquid return pipe to said evaporator.

3. In an air conditioning apparatus, an evaporator having a liquid therein, a condenser, means for successively passing air through said evaporator and said condenser whereby the air passing through said evaporator gives up heat and causes vaporization of the liquid and increases the pressure in the evaporator, pipe means for conducting the vapor from the evaporator to the condenser, means interposed between said evaporator and said condenser for cooling the air flowing from the evaporator to the condenser whereby the cooled air condenses the vapor and reduces the pressure in the condenser, conducting means for conducting the condensed vapor to the evaporator, the conducting means, evaporator, pipe means, and condenser, providing a closed system in which circulation is induced by the pressure differences in the evaporator and the condenser created by the difference in air temperatures to which the evaporator and condenser are subjected, and means in said pipe means for regulating the vapor flow to said condenser.

4. In an air conditioning apparatus, an evaporator having a liquid therein, a condenser, means for successively passing air through said evaporator and said condenser whereby the air passing through said evaporator gives up heat and causes vaporization of the liquid and increases the pressure in the evaporator, pipe means for conducting the vapor from the evaporator to the condenser, means interposed between said evaporator and said condenser for cooling the air flowing from the evaporator to the condenser whereby the cooled air condenses the vapor and reduces the pressure in the condenser, conducting means for conducting the condensed vapor to the evaporator, the conducting means, evaporator, pipe means, and condenser providing a closed system in which circulation is induced by the pressure differences in the evaporator and the condenser created by the difference in air temperatures to which the evaporator and condenser are subjected, and regulating means in said pipe means for condensing a part of the vapor prior to flow thereof into said condenser to thereby regulate the vapor flow to said condenser.

5. In an air conditioning apparatus, an evaporating having a liquid therein, a condenser, means for successively passing air through said evaporator and said condenser whereby the air passing through said evaporator gives up heat and causes vaporization of the liquid and increases the pressure in the evaporator, pipe means for conducting the vapor from the evaporator to the condenser, means interposed between said evaporator and said condenser for cooling the air flowing from the evaporator to the condenser whereby the cooled air condenses the vapor and reduces the pressure in the condenser, conducting means for conducting the condensed vapor to the evaporator, the conducting means, evaporator, pipe means, and condenser providing a closed system in which circulation is induced by the pressure differences in the evaporator and the condenser created by the difference in air temperatures to which the evaporator and condenser are subjected, regulating means in said pipe means for condensing a part of the vapor prior to flow thereof into said condenser to thereby regulate the vapor flow to said condenser, and means for returning condensed vapor from said regulating means to said evaporator.

6. In an air conditioning system for a plurality of independent rooms or the like, a common source of conditioned air for said rooms, means for extracting sensible heat from air flowing to said common source, means for reintroducing the sensible heat to the conditioned air as it flows into each of the rooms, and independent means in each of the rooms for controlling the addition of sensible heat to the air flowing into each room.

7. In an air conditioning system, air conditioning means including an inlet, a duct leading from said air conditioning means to a plurality of independent rooms or the like and having inlets extending from said duct to said rooms, means in the inlet to said air conditioning means for extracting sensible heat from air flowing to said conditioning means, and means in said inlets for adding the extracted heat to conditioned air flowing through said inlets.

8. In an air conditioning system, air conditioning means including an inlet, a duct leading from said air conditioning means to a plurality of independent rooms or the like and having inlets extending from said duct to said rooms, means in the inlet to said air conditioning means for extracting sensible heat from air flowing to said conditioning means, means in said inlets for adding the extracted heat to conditioned air flowing through said inlets, and independent means responsive to the dry bulb temperature in each of said rooms for controlling the addition of sensible heat to air flowing through said inlets.

9. In an air conditioning system, air conditioning means including an inlet, a duct leading from said air conditioning means to a plurality of independent rooms or the like and having inlets extending from said duct to said rooms, means in the inlet to said air conditioning means for extracting sensible heat from air flowing to said conditioning means, means in said inlets for adding the extracted heat to conditioned air flowing through said inlets, and independent means responsive to the humidity in each of said rooms for controlling the addition of sensible heat to air flowing through said inlets.

10. In an air conditioning system for a plurality of independent rooms or the like, a common source of conditioned air for said rooms, means extracting sensible heat from air flowing to said common source, means for reintroducing the sensible heat to the conditioned air as it flows into each of the rooms, and means controlling the volume of air passing to each of the rooms.

11. In an air conditioning system for a plurality of independent rooms or the like, a common source of conditioned air for said rooms, means extracting sensible heat from air flowing to said common source, means for reintroducing the sensible heat to the conditioned air as it flows into each of the rooms, means controlling the volume of air flowing to each of the rooms, and independent means responsive to the dry bulb temperature in each of the rooms for regulating the operation of the air volume controlling means.

12. In an air conditioning system for a plurality of independent rooms or the like, a common source of conditioned air for said rooms, means extracting sensible heat from air flowing to said common source, means for reintroducing the sensible heat to the conditioned air as it flows into each of the rooms, means controlling the volume of air flowing to each of the rooms, and independent means responsive to the humidity in each of said rooms for regulating the operation of the air volume controlling means.

13. An air conditioning system including an inlet for conditioned air, means in said inlet for adding sensible heat to air flowing therethrough, means controlling the volume of air flowing through said inlet, means responsive to the dry bulb temperature in the room for regulating the operation of the volume controlling means, and means responsive to the humidity in said room for regulating the addition of sensible heat to conditioned air flowing through said inlet.

14. In an air conditioning system adaptable for use in connection with a plurality of independent rooms or the like, a duct leading from a source of conditioned air, said duct having independent inlets extending therefrom to each of said rooms, condensers in each of said inlets and extending entirely thereacross, an evaporator in the inlet to said source of conditioned air, and means connecting said evaporator to the condensers in said inlets.

15. In an air conditioning system adaptable for use in connection with a plurality of independent rooms or the like, a duct leading from a source of conditioned air, said duct having independent inlets extending therefrom to each of said rooms, condensers in each of said inlets and extending entirely thereacross, an evaporator in the inlet to said source of conditioned air, means connecting said evaporator to the condensers in said inlets, and means controlling communication between said condensers and said evaporator.

16. In an air conditioning system adaptable for use in connection with a plurality of independent rooms or the like, a duct leading from a source of conditioned air, said duct having independent inlets extending therefrom to each of said rooms, condensers in each of said inlets and arranged at one side thereof to provide passages thereabout in the inlets, an evaporator in the inlet to said source of conditioned air, means connecting said evaporator to the condensers in said inlets, and means controlling the flow of conditioned air through said passages and said condensers.

17. An air conditioning system including an air conditioning means having an air inlet, an air outlet duct leading from said air conditioning means, an evaporator in said inlet, a condenser in said duct, means connecting said evaporator and said condenser and having a chamber therein, means for circulating a cooling medium through said chamber, and means providing a return from said condenser to said evaporator.

18. An air conditioning system including an air conditioning means having an air inlet, an air outlet duct leading from said air conditioning means, an evaporator in said inlet, a condenser in said duct, means connecting said evaporator and said condenser and having a chamber therein, a coil in said chamber, and means providing a return from said condenser to said evaporator.

19. In an air conditioning system including an air conditioning means having an air inlet, an air outlet duct leading from said air conditioning means, an evaporator in said inlet and having a fluid therein in a liquid state, a condenser in said duct, means connecting said evaporator and said condenser and having a chamber therein, means providing a return from said condenser to said evaporator, air passing through said inlet acting on the liquid in said evaporator to convert it into a vapor state whereby the vapor passes through said chamber to said condenser, and means for circulating a cooling medium through said chamber to regulate the quantity of vapor passed to said condenser.

20. An air conditioning system including an air conditioning means having an air inlet, an air outlet duct leading from said air conditioning means, a fluid receiving member in said outlet, a fluid receiving member in said inlet, means connecting said fluid receiving members and having a chamber therein, heating means in said chamber, and other means interconnecting said fluid receiving members and said chamber.

21. An air conditioning system including an air conditioning means having an air inlet, an air outlet duct leading from said air conditioning means, an evaporator in said inlet, a condenser in said duct, means connecting said evaporator and said condenser and having a chamber therein, a coil in said chamber, means providing a return from said condenser to said evaporator, and means providing a return from said chamber to said evaporator.

22. An air conditioning system including an air conditioning means having an air inlet, an air outlet duct leading from said air conditioning means, a fluid receiving member in said outlet, a fluid receiving member in said inlet, means connecting said fluid receiving members and having a chamber therein, heating means in said chamber, other means interconnecting said fluid receiving members and said chamber, and means for circulating said fluid through said fluid receiving members, said chamber, and said other interconnecting means.

23. Air conditioning apparatus for a space to be conditioned including a volatile secondary refrigerant evaporator, a primary refrigerant air super-cooler and a volatile secondary refrigerant condenser in thermal exchange relationship with air for said space, said evaporator and condenser forming a substantially constant pressure system, and means responsive to relative humidity conditions controlling the flow of secondary refrigerant between said evaporator and condenser.

24. Air conditioning apparatus for a space to be conditioned including a volatile secondary refrigerant evaporator, a primary refrigerant air super-cooler and a volatile secondary refrigerant condenser in thermal exchange relationship with air for said space, said evaporator and condenser forming a substantially constant pressure system, and means responsive to relative humidity conditions controlling the effect of said condenser on air in said space.

25. Air conditioning apparatus for a space to be conditioned including a volatile secondary refrigerant evaporator, a primary refrigerant air super-cooler and a volatile secondary refrigerant condenser in thermal exchange relationship with air for said space, said evaporator and condenser forming a substantially constant pressure system, means responsive to a function of the psychrometric property of air controlling the effect of said super-cooler on the air in said space, and means responsive to a different function of the psychrometric property of air controlling the effect of said condenser on air in said space.

26. Air conditioning apparatus for a space to be conditioned including means creating a stream of air to be conditioned for said space, a primary refrigerant air cooler in thermal contact with said stream, a secondary volatile refrigerant evaporator, and a secondary volatile refrigerant condenser on opposite sides of said air cooler, said evaporator and condenser forming a substantially constant pressure system, said condenser being above said evaporator.

27. Air conditioning apparatus for a space to be conditioned including means creating a stream of air to be conditioned for said space, a primary refrigerant air cooler in thermal contact with said stream, a secondary volatile refrigerant evaporator, a secondary volatile refrigerant condenser on opposite sides of said air cooler, said evaporator and condenser forming a substantially constant pressure system, said condenser being above said evaporator, and a control automatically responsive to air conditions controlling the operation of said apparatus.

28. Air conditioning apparatus for a space to be conditioned including a sensible heat remover, a super-cooler and a sensible heat returner, all in thermal exchange relationship with air for said space, and said super-cooler being independent of said remover and returner means responsive to a function of the psychrometric property of air in said space controlling the effect of said super-cooler on air in said space, and means responsive to another function of the psychrometric property of air in said space controlling the effect of said returner on air in said space.

29. Air conditioning apparatus for a space to be conditioned including a secondary refrigerant sensible heat remover, a primary refrigerant air super-cooler and a secondary refrigerant sensible heat returner, all in thermal exchange relationship with air for said space, and said super-cooler being independent of said remover and returner means responsive to a function of the psychrometric property of air in said space controlling the effect of said super-cooler on air in said space, means responsive to another function of the psychrometric property of air in said space controlling the flow of secondary refrigerant between said remover and returner.

30. Air conditioning apparatus for a space to be conditioned including a volatile secondary refrigerating system having an evaporator and condenser, a primary refrigerant air super-cooler independent of said volatile secondary refrigerating system, said evaporator, condenser and super-cooler being in thermal exchange relationship with air for said space, and means responsive to relative humidity conditions controlling the flow of secondary refrigerant between said evaporator and condenser.

31. Air conditioning apparatus for a space to be conditioned including a volatile secondary refrigerating system having an evaporator and condenser, a primary refrigerant air super-cooler independent of said volatile secondary refrigerating system, said evaporator, condenser and super-cooler being in thermal exchange relationship with air for said space, and means responsive to relative humidity conditions controlling the effect of said condenser on air in said space.

32. Air conditioning apparatus for a space to be conditioned including a volatile secondary refrigerating system having an evaporator and condenser, a primary refrigerant air super-cooler independent of said volatile secondary refrigerating system, said evaporator, condenser and super-cooler being in thermal exchange relationship with air for said space, means responsive to a function of the psychrometric property of air controlling the effect of said super-cooler on the air in said space, and means responsive to a different function of the psychrometric property of air controlling the effect of said condenser on air in said space.

33. Air conditioning apparatus for an enclosure including means for removing heat from air for said enclosure, means for independently cooling the air after the removal of said heat whereby moisture is removed from said air, means for introducing said removed heat to said enclosure, means for controlling the quantity of cold air circulated into said enclosure in accordance with temperature conditions in said enclosure, and means for controlling the addition of heat in accordance with humidity conditions.

34. Air conditioning apparatus for an enclosure including means for removing heat from air for said enclosure, means for independently cooling the air after the removal of said heat whereby moisture is removed from said air, means for introducing said removed heat to said enclosure, means for controlling the quantity of cold air circulated into said enclosure in accordance with temperature conditions in said enclosure, and means for controlling the removal of heat in accordance with humidity conditions.

35. The method of conditioning air for an enclosure which comprises removing heat from air for said enclosure, independently cooling the air after the removal of said heat to remove moisture from said air, introducing said removed heat to said enclosure, and controlling the removal of said heat in accordance with humidity conditions in said enclosure.

WILLIAM GOODMAN.